June 9, 1953 R. C. LEGAT ET AL Re. 23,666

KEY SUPPORT

Original Filed March 24, 1949

WITNESS

G. V. Rasmussen

INVENTOR.
ROBERT C. LEGAT
EMILIO BARETTA

BY John J. Hart

ATTORNEY

Reissued June 9, 1953 Re. 23,666

UNITED STATES PATENT OFFICE 23,666

KEY SUPPORT

Robert C. Legat, New Britain, and Emilio Baretta, Kensington, Conn., assignors to The G. E. Prentice Mfg. Co., Kensington, Conn., a corporation of Connecticut Original No. 2,606,438, dated August 12, 1952, Serial No. 83,182, March 24, 1949. Application for reissue February 17, 1953, Serial No. 337,453

9 Claims. (Cl. 70—456)

Matter enclosed in heavy brackets [ ] appears in the original patent but forms no part of this reissue specification; matter printed in italics indicates the additions made by reissue.

This invention relates generally to key cases and more particularly to key supporting means for such cases.

The principal object of the invention is to provide an improved key holding means for reliably securing the individual keys in a case. More specifically the invention contemplates providing a key holder which will permit the key hangers or hooks to be readily inserted into or removed from such holder, but which will automatically secure an inserted key hook in position thereon until it is desired to release such hook.

Figure 1:
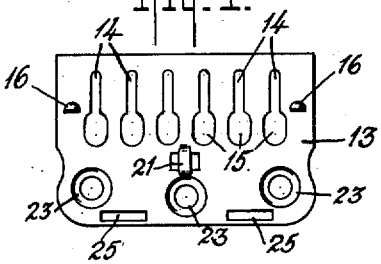
Figure 3:
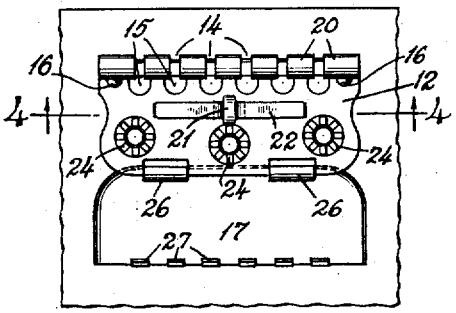
Figure 2:
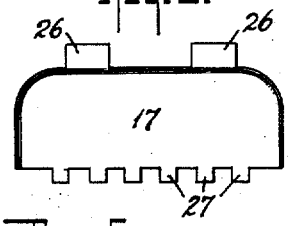
Figure 4:
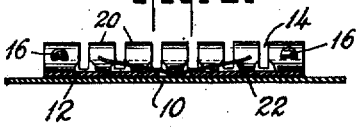
Figure 5:
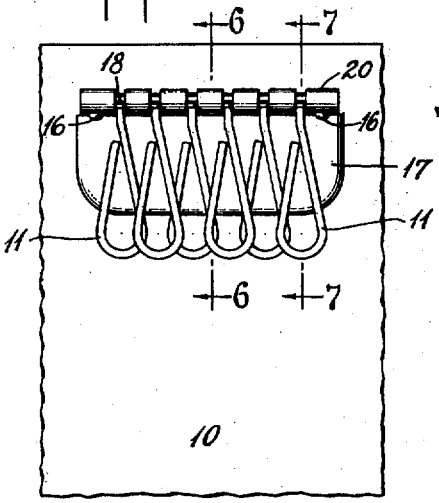
Figure 6:
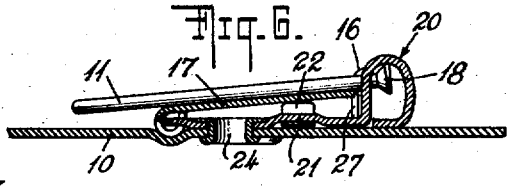
Figure 7:
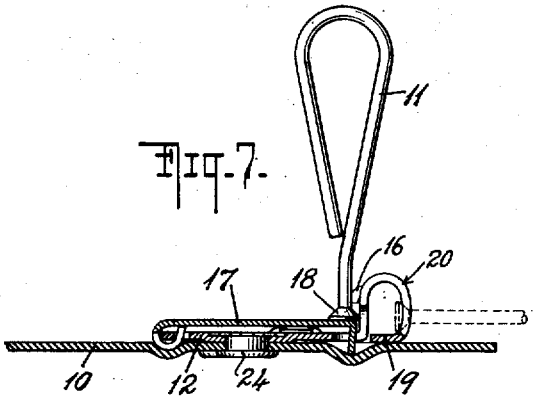
Figure 8:
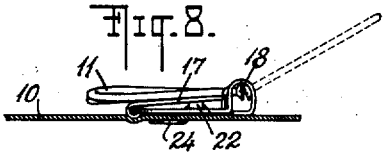

Other objects of the invention as well as the novel features of its construction, will become apparent from the following description when read in connection with the accompanying drawings, in which Fig. 1 is a top plan view of the blank from which the supporting plate of the holder is formed; Fig. 2 is a plan view of the blank from which the key hanger retaining plate of the holder is formed; Fig. 3 is a front elevational view of the key holder assembly showing the same secured to a portion of a key case and with the retaining plate swung to an open inoperative position to show the arrangement of the parts intermediate such plate and the supporting plate of the assembly; Fig. 4 is a sectional view taken along the line 4—4 of Fig. 3; Fig. 5 is a front elevational view of the key holder as it appears in the casing with the parts in assembled operative condition; Fig. 6 is a sectional view taken along the line 6—6 of Fig. 5 and showing the retaining plate in its normal position; Fig. 7 is a sectional view taken along the line 7—7 of Fig. 5 and showing the relation of the parts when the retaining plate is depressed to permit the removal or insertion of a key hanger, and Fig. 8 is a side elevational view of Fig. 5.

In the drawings, the reference numeral 10 indicates a portion of a key case which may be made of leather or any other suitable material and which may have any suitable configuration to accommodate keys connected to the hangers or hooks 11 of the key holder of this invention. The holder is composed of a supporting plate 12 which may be formed from a sheet metal blank 13 such as shown in Fig. 1 of the drawings. The blank 13 is provided with a plurality of spaced slots 14 arranged in a row across the upper part of the blank and having enlarged portions 15 at the lower ends thereof so that each opening has an inverted substantially keyhole shape. Stamped out of the material of blank 13 on each side of the row of slots 14 and located adjacently above the upper ends of the slot portions 15, is an abutment 16 whose upper surface is curved and whose lower edge or lip forms a latch or stop for the retaining plate 17 of the holder, as will hereinafter become more clear. In forming the supporting plate 12 from the blank 13 the upper portion of the latter is first bent forwardly at substantially right angles to the remainder of the plate and along a longitudinal line extending intermediate the ends of the enlarged portions 15 of the openings so that the head 18 of a key hook may be readily inserted through such enlarged forwardly extending portion of an opening 14 while holding the key hook 11 vertically. The upper part of the blank 13 is then bent rearwardly so that the area thereof from the first mentioned bend to the upper ends of the openings is substantially U-shaped in form (note Fig. 7). The upper edge portion of the blank 13 is then bent downwardly to close the space between the legs of the U-shaped bend and thereby form a backing 19 for the forwardly projecting bead-like portion 20 so formed along the upper edge of the supporting plate 12 (note Figs. 6 to 8). It will be noted from Fig. 3 of the drawings that the bead-like portion 20 extends the entire length of the plate 12 and is provided with six openings or slots 14 spaced to accommodate six key hooks 11 arranged in flat overlapping relation, as is shown in Fig. 5 of the drawings.

Adjacently below the row of openings 14 and located centrally of the length of the blank 13 is an integral strip or strap 21 formed by cut-outs of the blank material on both sides thereof and disposed slightly forwardly of the plate 12 (note Fig. 6). The strap 21 serves as a holder or mounting for a metal strip 22 which is supported intermediate its ends by strap 21 and extends under the latter and over the front surface of the supporting plate 12 (note Fig. 3). The strip 22 is made of spring material and its ends are bent outwardly from the strap 21 to provide two oppositely disposed spring members which are normally inclined with relation to the front surface of supporting plate 12, as is shown more clearly in Fig. 4 of the drawings. The free ends of the strip or spring member 22 bear against the under surface of the retaining plate 17 to normally bias such plate forwardly so that its upper edge is in engagement with the projecting lips of the stop members 16, 16 on the bead-like portion 20 of plate 12.

Located below the strap 21 of supporting plate 12 are three longitudinally spaced openings 23 through which extend the shanks of rivets 24 by which such plate and consequently the holder assembly are secured to the key case portion 10. The areas of plate 12 around openings 23 may be depressed, as is shown more clearly in Figs. 1 and 6 of the drawings, in order that the upset forward ends of the rivets 24 will be substantially flush with the front surface of supporting plate 12. Provided on the lower edge of blank 13 is a pair of aligned rectangularly-shaped openings 25 through which extend the curled hinge members 26, 26 by which the retaining plate 17 is hingedly connected to the supporting plate 12. It will be noted that the hinged connection of plate 17 with plate 12 is provided between the lower edges of such plates so that retainer plate 17 may be swung forwardly and downwardly away from the supporting plate 12 to the position shown in Fig. 3 of the drawings. The configuration of retaining plate 17 is such that when in its normal overlying position on plate 12, it will cover the enlarged portions 15 of the slots 14 which extend into plate 12 below the bead-like portion 20 (note Fig. 5). Provided along the upper edge of the retaining plate 17 is a plurality of spaced fingers 27 which are disposed at right angles to such plate and extend rearwardly thereof. The fingers 27 are equal in number to the number of slots 14 and are arranged on retaining plate 17 so that in the normal position of the latter on the supporting plate 12 (note Figs. 5 and 6), such fingers will block the enlarged portions 15 of the slots 14 which are in the bead-like portion 20.

It will be understood from the foregoing, that in the normal condition of the parts, the retaining plate 17 will overlie the supporting plate 12 and will have been pressed past the stops or abutments 16, 16 on the bead-like portion 20 so that the lips thereof will prevent the retaining plate 17 from swinging outwardly and downwardly away from a position in which the fingers 27 thereof will no longer block the enlarged portions 15 of the slots 14 in the bead-like portion 20. It will be noted that the smooth curved upper surfaces of the stops 16, 16 will facilitate this proper assembling of the two plates and that when the plates are in assembled relation, the retaining plate 17 will conceal from the view of the user, the enlarged portions 15 of the slots, the spring member 22, the upset ends of the rivets 22 and the hinged connection between the two plates. The spring member 22 is so constructed that its ends will normally maintain the retaining plate 17 in a raised position with its upper edge engaging the stops 16, 16 and its fingers 27 blocking the enlarged portions 15 of the slots in the bead-like portion 20. In the normal condition of the parts therefore, the heads 18 of the key hangers 11 cannot be passed through the enlarged portions 15 of the slots so that the key hangers cannot be disengaged from the bead-like portion 20. When the user desires to disengage a hook from the bead-like portion 20 or to insert another hook therein, he merely depresses the retaining plate 17 against the tension of the spring 22. As plate 17 moves toward the supporting plate 12 under such pressure, the fingers 27 of plate 17 will enter into the enlarged portions 15 of the slots in plate 12 below the bead-like portion 20 and the upper edge of retaining plate 17 will expose to the user's view the outer ends of the enlarged portions 15 of the slots in the bead-like portion 20. When the retaining plate 17 has been pressed in as far as it will go, sufficient of the enlarged portions 15 of the slots in the bead-like portion 20 will have been exposed to permit the ready removal or insertion of a key hanger head 18 through an enlarged slot portion. Thus, a key hanger hook 11 may be easily detached or inserted when the retaining plate 17 is so pressed inwardly, by raising the hook to a vertical position and then using the exterior surface of the retaining plate as a guide, passing the hook through the slot in the manner illustrated in Fig. 7 of the drawings. Due to the construction of the spring member 22, relatively little force is required to press the retaining plate 17 inwardly and the free ends of such member will readily slide over the under surface of such plate as they are spread under the applied force. The inward movement of the retaining puate 17 is stopped when it comes into engagement with the outer surface of the strap 21, such strap consequently not only serving as a support for the spring member 22, but in the operation of the device also serving as a means for limiting the hinged movement of the retaining plate 17 in one direction. As soon as the applied force on retaining plate 17 is released, the spring member 22 will raise it automatically to its normal position, in which position the fingers 27 will again prevent the disengagement of a key hook 11 from the bead-like portion as has been described.

It will be evident from the foregoing, that the present invention provides a simply constructed, key holding means which is attractive in appearance, which is easy to manipulate and which will automatically lock the key hangers in position until positively actuated to permit the disengagement of such hangers. It will also be evident that while we have illustrated in the drawings and hereabove described a preferred embodiment of our invention, various modifications and changes may be made therein without departing from the spirit of the invention or the scope of the appended claims.

We claim:

1. A key support for a key case or the like, comprising a supporting plate having in its upper part a bead-like forwardly projecting portion and a plurality of openings extending transversely of said bead-like portion and having enlarged portions adjacent to the line of juncture of said bead-like portion with the body of said supporting plate, the enlarged portions of said slots being of a size to permit the passage therethrough of the heads of key hooks, a retainer plate *overlying said supporting plate and* movably connected to said supporting plate, the upper portion of said retainer plate normally blocking the removal of key hook heads through the enlarged slot portions and being movable from its normal position *inwardly* towards said supporting plate to permit passage of the heads through such enlarged slot portions, [and] yieldable means intermediate said supporting plate and said retainer plate for maintaining the latter in its normal position and for yieldably resisting movement of said retainer plate toward said supporting plate, *and means for limiting the outward movement of said retainer plate under the influence of said yieldable means.*

2. A key support for a key case or the like, comprising a supporting plate having in its upper part a bead-like forwardly projecting portion and a plurality of openings extending transversely of said bead-like portion and having enlarged portions adjacent to the line of juncture of said bead-like portion with the body of said supporting plate, the enlarged portions of said slots being of a size to permit the passage therethrough of the heads of key hooks, a retainer plate overlying said supporting plate below the bead-like portion of the latter, hinge means pivotally connecting said retainer plate to said supporting plate, the upper portion of said retainer plate normally blocking the removal of key hook heads through the enlarged slot portions and being movable from its normal position inwardly towards said supporting plate to permit passage of the heads through such enlarged slot portions, spring means mounted on said supporting plate and positioned intermediate the latter and said retainer plate, said spring means maintaining said retainer plate in its normal position and yieldingly resisting movement of said retainer plate towards said supporting plate, and stop means for limiting the outward movement of said retainer plate under the influence of said spring means.

3. A key support for a key case or the like, comprising a supporting plate having a planar body portion and a forwardly projecting bead-like portion adjacently above said planar portion, said bead-like portion having a plurality of transverse slots therein, the upper portions of said slots being narrow and the lower portions of said slots adjacent to said planar portion being enlarged to permit the passage therethrough of the heads of key hooks, the enlarged portions of said slots extending into the material of said planar portion, a retainer plate movably connected to said supporting plate and having at its upper end a plurality of offset fingers equal in number to said slots, said retainer plate being normally positioned so that said fingers block the enlarged slot portions on said bead-like portion and being movable from its normal position inwardly towards said supporting plate to remove said fingers from their blocking relation with such enlarged slot portions on said bead-like portion and to permit passage of the hook heads therethrough, said fingers during the inward movement of said retainer plate entering into the enlarged slot portions in said planar portion of the supporting plate, spring means positioned intermediate said supporting plate and said retainer late for maintaining the latter in its normal position and for yieldingly resisting movement of the same towards said supporting plate, and stop means on said bead-like portion for limiting the outward movement of said retainer plate under the influence of said spring means.

4. A key support for a key case or the like, comprising a supporting plate having a planar body portion and a forwardly projecting bead-like portion adjacently above said planar portion, said bead-like portion having a plurality of transverse slots therein, the upper portions of said slots being narrow and the lower portions of said slots adjacently to said planar portion being enlarged to permit the passage therethrough of the heads of key hooks, the enlarged portions of said slots extending into the material of said planar portion, a retainer plate movably connected to said supporting plate and having at its upper end a plurality of offset fingers equal in number to said slots, said retainer plate being normally positioned so that said fingers block the enlarged slot portions on said bead-like portion and being movable from its normal position inwardly towards said supporting plate to remove said fingers from their blocking relation with such enlarged slot portions on said bead-like portion and to permit passage of the hook heads therethrough, said fingers during the inward movement of said retainer plate entering into the enlarged slot portions in said planar portion of the supporting plate, a spring member positioned intermediate said supporting plate and said retainer plate for maintaining the latter in its normal position and for yieldingly resisting movement of the same towards said supporting plate, said spring member being secured at its central portion to said supporting plate below the enlarged portions of said slots and having two free ends inclining upwardly from the central portion thereof into engagement with the inner surface of said retainer plate, and stop means on said bead-like portion for limiting the outward movement of said retainer plate under the influence of said spring means.

5. A key support for a key case or the like, comprising a supporting plate having in its upper part a forwardly projecting bead-like portion, said bead-like portion having a transverse slot therein, the upper portion of said slot being narrow and the lower portion of said slot adjacent to the line of juncture of said bead-like portion with the body of said supporting plate being enlarged to permit the insertion of the head of a key hook therethrough, retaining means overlying said supporting plate and normally blocking the removal of a key hook head through the enlarged portion of said slot, means movably connecting said retaining means to said supporting plate and enabling said retaining means to move from such normal position inwardly towards said supporting plate to permit passage of a key hook head through such enlarged slot portion, and resilient means for maintaining said retaining means in normal position and for yieldingly resisting movement of said retaining means towards said supporting plate.

6. A key support for a key case or the like, comprising a supporting plate having in its upper part a forwardly projecting bead-like portion, said bead-like portion having a transverse slot therein, the upper portion of said slot being narrow and the lower portion of said slot adjacent to the line of juncture of said bead-like portion with the body of said supporting plate being enlarged to permit the insertion of the head of a key hook therethrough, retaining means overlying said supporting plate and normally blocking the removal of a key hook head through the enlarged portion of said slot, means movably connecting said retaining means to said supporting plate and enabling said retaining means to move from such normal position inwardly towards said supporting plate to permit passage of a key hook head through such enlarged slot portion, a spring positioned intermediate said supporting plate and said retaining means for maintaining the latter in normal position and for yieldingly resisting movement of the same towards said supporting plate, and stop means for limiting the outward movement of said retaining means under the influence of said spring.

7. A key support for a key case or the like, comprising a supporting plate having in its upper part a forwardly projecting bead-like portion, said bead-like portion having a transverse slot therein, the upper portion of said slot being narrow and the lower portion of said slot adjacent to the line of juncture of said bead-like portion with the body of said supporting plate being enlarged to permit the insertion of the head of a key hook therethrough, the enlarged portion of said slot extending into the material of said plate adjoining said bead-like portion, a member overlying said supporting plate and movably connected to the same, a blocking member provided on the upper end of said overlying member, said overlying member being normally positioned so that said blocking member closes the enlarged slot portion on said bead-like portion and being movable from its normal position inwardly towards said supporting plate to remove said blocking member from its closing relation with such enlarged slot portion to permit passage of a key hook head therethrough, said blocking member during the inward movement of said overlying member entering into the enlarged slot portion in the portion of the plate adjoining said bead-like portion, and spring means below said blocking member and intermediate said supporting plate and said overlying member for maintaining the latter in its normal position and for yieldingly resisting movement of the same towards said supporting plate.

8. A key support for a key case or the like, comprising a supporting plate having in its upper part a forwardly projecting bead-like portion, said bead-like portion having a transverse slot therein, the upper portion of said slot being narrow and the lower portion of said slot adjacently over the line of juncture of said bead-like portion with the body of said supporting plate being enlarged to permit the insertion of the head of a key hook therethrough, and retaining means for normally blocking passage of a key hook through such enlarged slot portion overlying said supporting plate and movably mounted on the body portion of said plate for movement relative thereto, said retaining means including a member normally raised relative to said supporting plate to block the enlarged portion of the slot in said bead-like portion in the normal condition of such retaining means and movable from such raised blocking position inwardly toward said supporting plate to uncover the enlarged portion of the slot in said bead-like portion and means operable to move said blocking member inwardly to a position in which such enlarged portion of the slot in said bead-like portion is uncovered to permit the removal of a key hook, and means for returning said retaining means to normal condition in which said blocking member is raised to its normal blocking position after such inward movement of the latter.

9. A key support for a key case or the like, comprising a supporting plate having in its upper part a forwardly projecting bead-like portion, said bead-like portion having a transverse slot therein, the upper portion of said slot being narrow and the lower portion of said slot adjacently over the line of juncture of said bead-like portion with the body of said supporting plate being enlarged to permit the insertion of the head of a key hook therethrough, and retaining means for normally blocking passage of a key hook through such enlarged slot portion overlying said supporting plate and movably mounted on the body portion of said plate for movement relative thereto, said retaining means including a member underlying said bead-like portion and normally raised relative to said supporting plate to block the enlarged portion of the slot in said bead-like portion in the normal condition of such retaining means and movable from such raised blocking position inwardly toward said supporting plate to uncover the enlarged portion of the slot in said bead-like portion and depressible means operable to move said blocking member inwardly to a position in which such enlarged portion of the slot in said bead-like portion is uncovered to permit the removal of a key hook, and means yieldingly resisting movement of said depressible means to unblock such enlarged portion of the slot and for raising said blocking member to its normal blocking position after pressure on said depressible means has been released.

ROBERT C. LEGAT.
EMILIO BARETTA.

References Cited in the file of this patent or the original patent

UNITED STATES PATENTS

| Number | Name | Date |
|---|---|---|
| 1,904,354 | Buxton | Apr. 18, 1933 |
| 2,038,070 | Welch | Apr. 21, 1936 |
| 2,051,432 | Zahn | Aug. 18, 1936 |
| 2,093,327 | Legat | Sept. 14, 1937 |
| 2,201,850 | Dawson, Jr. | May 21, 1940 |
| 2,421,492 | Geller | June 3, 1947 |